United States Patent
Rennie et al.

(10) Patent No.: US 12,166,673 B2
(45) Date of Patent: Dec. 10, 2024

(54) MEDIA ACCESS CONTROL ADDRESS REWRITE USING EGRESS HEADER EDITING IN TRAFFIC AGGREGATION MODE

(71) Applicant: Arista Networks, Inc., Santa Clara, CA (US)

(72) Inventors: Graeme Jeffrey Rennie, Dublin (IE); James C. Pang, Vancouver (CA)

(73) Assignee: ARISTA NETWORKS, INC., Santa Clara, CA (US)

( * ) Notice: Subject to any disclaimer, the term of this patent is extended or adjusted under 35 U.S.C. 154(b) by 391 days.

(21) Appl. No.: 17/716,719

(22) Filed: Apr. 8, 2022

(65) Prior Publication Data

US 2023/0327988 A1 Oct. 12, 2023

(51) Int. Cl.
| | | |
|---|---|---|
| *H04L 45/00* | (2022.01) | |
| *H04L 45/02* | (2022.01) | |
| *H04L 45/302* | (2022.01) | |
| *H04L 45/74* | (2022.01) | |
| *H04L 69/22* | (2022.01) | |

(52) U.S. Cl.
CPC .............. *H04L 45/66* (2013.01); *H04L 45/02* (2013.01); *H04L 45/306* (2013.01); *H04L 45/74* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 7,613,209 B1 * | 11/2009 | Nguyen | ................ | H04L 69/22 370/476 |
| 11,303,568 B1 * | 4/2022 | Haridas | ................ | H04L 45/42 |
| 11,736,380 B2 * | 8/2023 | Kaku | ................ | H04L 49/102 370/258 |
| 2006/0235995 A1 * | 10/2006 | Bhatia | ................ | H04L 12/4641 709/238 |
| 2013/0028258 A1 * | 1/2013 | Carney | ................ | H04L 69/22 370/392 |
| 2013/0058354 A1 * | 3/2013 | Casado | ................ | H04L 41/0895 370/401 |

(Continued)

FOREIGN PATENT DOCUMENTS

| | | | | | |
|---|---|---|---|---|---|
| EP | 3855685 A1 * | 7/2021 | ............. | H04L 12/18 |
| WO | WO-2022006005 A1 * | 1/2022 | ......... | H04L 12/1886 |

OTHER PUBLICATIONS

"TAP Aggregation with DANZ" Arista Networks, Santa Clara-Corporate Headquarters. Feb. 1, 2017. (6 pages).

*Primary Examiner* — Ajit Patel
(74) *Attorney, Agent, or Firm* — Sprinkle IP Law Group (57) ABSTRACT

In general, embodiments relate to a method, obtaining, by a monitoring fabric network device operating in the monitoring fabric, a packet, wherein the packet is a replication of a packet sent to a second network device, applying a classification to the packet, performing, using the classification, a modification on a layer 2 (L2) address of the packet to obtain a modified packet, wherein the modified packet includes a modified L2 address, and transmitting the modified packet to a second monitoring fabric network device based on forwarding policies, wherein the forwarding policies do not utilize the modified L2 address.

20 Claims, 5 Drawing Sheets

(56) References Cited

U.S. PATENT DOCUMENTS

2013/0195457 A1* 8/2013 Levy .................... H04L 47/283
                                                    370/390
2021/0385169 A1* 12/2021 Urman ...................... H04L 1/08
2022/0210062 A1* 6/2022 Brar ................... H04L 12/4633

* cited by examiner

MEDIA ACCESS CONTROL ADDRESS REWRITE USING EGRESS HEADER EDITING IN TRAFFIC AGGREGATION MODE

BACKGROUND

During operation of a network that includes any number of network devices in which network traffic operates, the network may include a monitoring fabric. The monitoring fabric may include a set of monitoring fabric network devices. The monitoring fabric network devices may include functionality that includes obtaining participating packets via any monitoring mechanism.

DETAILED DESCRIPTION

A network may include any number of network devices through which network traffic flows. The network may further include a monitoring fabric. The monitoring fabric may include a set of monitoring fabric network devices. The monitoring fabric network devices may include functionality that includes obtaining participating packets (e.g., packets identified for sampling by network devices) via any monitoring mechanism. The monitoring mechanisms may include, for example, mirroring and forwarding of replications of the participating packets, port monitoring that transfers a copy of packets obtained from a port in a network device to the monitoring fabric network device. The monitoring fabric network devices may include functionality to analyze the obtained packets based on the information included in the packet. The information may be included, for example, in the header of the packet.

While performing the network monitoring, the monitoring fabric network devices may modify the header of obtained packets based on monitoring policies implemented by the monitoring fabric network devices. Following the modification, the packets may be forwarded to other monitoring fabric network devices based on forwarding policies. The forwarding policies may vary from traditional layer 2 (L2) protocols. For example, the forwarding policies may not use the L2 addresses specified in the header to determine where to forward the packet.

In conventional implementations, the modification includes adding classification tags to the header. The classification tags are added to unused reserved portions of the header (i.e., portions of the header that do not include L2 and/or L3 addresses). However, due to the limited size of the header (i.e., there are a limited number of unused reserved bits in the header), the granularity of the classifications is limited (i.e., only a limited set of possible classifications is supported). One conventional solution to address the aforementioned problem may be to introduce a new header field. However, this approach may result in an increased packet size and an increase in complexity for parsing and forwarding packets with the new header field by downstream network devices.

Embodiments disclosed herein include methods for modifying the layer 2 (L2) addresses of the packets obtained in the monitoring fabric network devices based on classifications determined for the packets. In one or more embodiments, the classifications may be performed based on, for example, the ingress interface of the monitoring fabric network device on which the packet arrives. Other classifications may be performed without departing from this disclosure. When a packet is classified, it may be determined to modify one or more of the L2 addresses (e.g., the MAC source address and/or MAC destination address). The modification may include, for example, a replacement of the current MAC source address and/or MAC destination address to a predetermined value or a value determined using a function (e.g., an arithmetic function) applied to the existing MAC source address and/or MAC destination address. Other mechanisms for determining the value that replaces the MAC source address and/or MAC destination address may be performed without departing from this disclosure. For example, other arithmetic functions may be performed unrelated to the original MAC source address or MAC destination address. In another example, the value may indicate which classification rules were matched by the packet or a portion thereof.

By using the portions of header traditionally used for L2 addresses to store classification tags, the namespace for the classification tags may be significantly expanded, compared to schemes where only reserved header bits are used for this purpose. This allows for users to implement more granular classifications. In addition, by not expanding the overall size of the header (i.e., by storing the classification tags in the portions of the header traditionally used for L2 addresses), the complexity of parsing and forwarding of packets, which include classification tags, is not increased for downstream network devices.

Further, in accordance with various embodiments of the disclosure, by utilizing all or a portion of the prior existing header fields for L2 addresses, the packet may include classification information without adding more fields to the header. In this manner, the type of the packet will not change once the classification tag(s) is added. Said another way, each packet type includes a certain number and type of header fields. If the number and type of fields in the header in a packet changes, then a downstream network device may determine the packet with these additional header fields is a different type of packet (i.e., a type of packet that is different than the type of packet being classified). This change in type may result in unintended issues with the processing of the packet (which now includes the classification tags) (see e.g., the first two examples below). By utilizing embodiments of the disclosure, this issue is avoided.

For example, the packet may be an Ethernet packet. The Ethernet packet may include zero or more IEEE 802.1Q ("dot1q" or "VLAN") tags. Other classification mechanisms may use additional dot1q (VLAN) tags to store classification information. This change could make a packet that is not in a VLAN become a VLAN packet; alternatively, it could make a packet contain too many VLAN tags (e.g. 3 or more) which would cause many network devices to not forward them properly.

Another example is the use of MPLS labels to store classification information. Such a change to a packet's header could result in a packet changing from a simple Ethernet packet into a MPLS over Ethernet packet, which many network devices cannot handle correctly. Alternatively, it could cause packets that have existing MPLS labels to exceed the maximum number of such labels that some network devices can parse.

As a third example, the packet may be very large, at or near the maximum transmission unit (MTU) and/or maximum receive unit (MRU) size limits of the transport network. The additional tags inserted by the classification process will require additional data to be added to the packet. By utilizing existing data in the header and not utilizing the additional data for the purpose of classifying the packet, embodiments disclosed herein reduce the risk of a classified and identified packet reaching or exceeding the maximum transmission unit (MTU) and/or maximum receive unit (MRU) of the transport network.

In order to facilitate the re-writing of the MAC source and/or destination addresses with one or more classification tags, the network device may use a specialized hardware block in an egress processing pipeline. The use of the specialized hardware block enables the rewriting in an efficient manner and without requiring use of resources from the control plane of the network device.

Various embodiments of the disclosure are described below.

Figure 1:
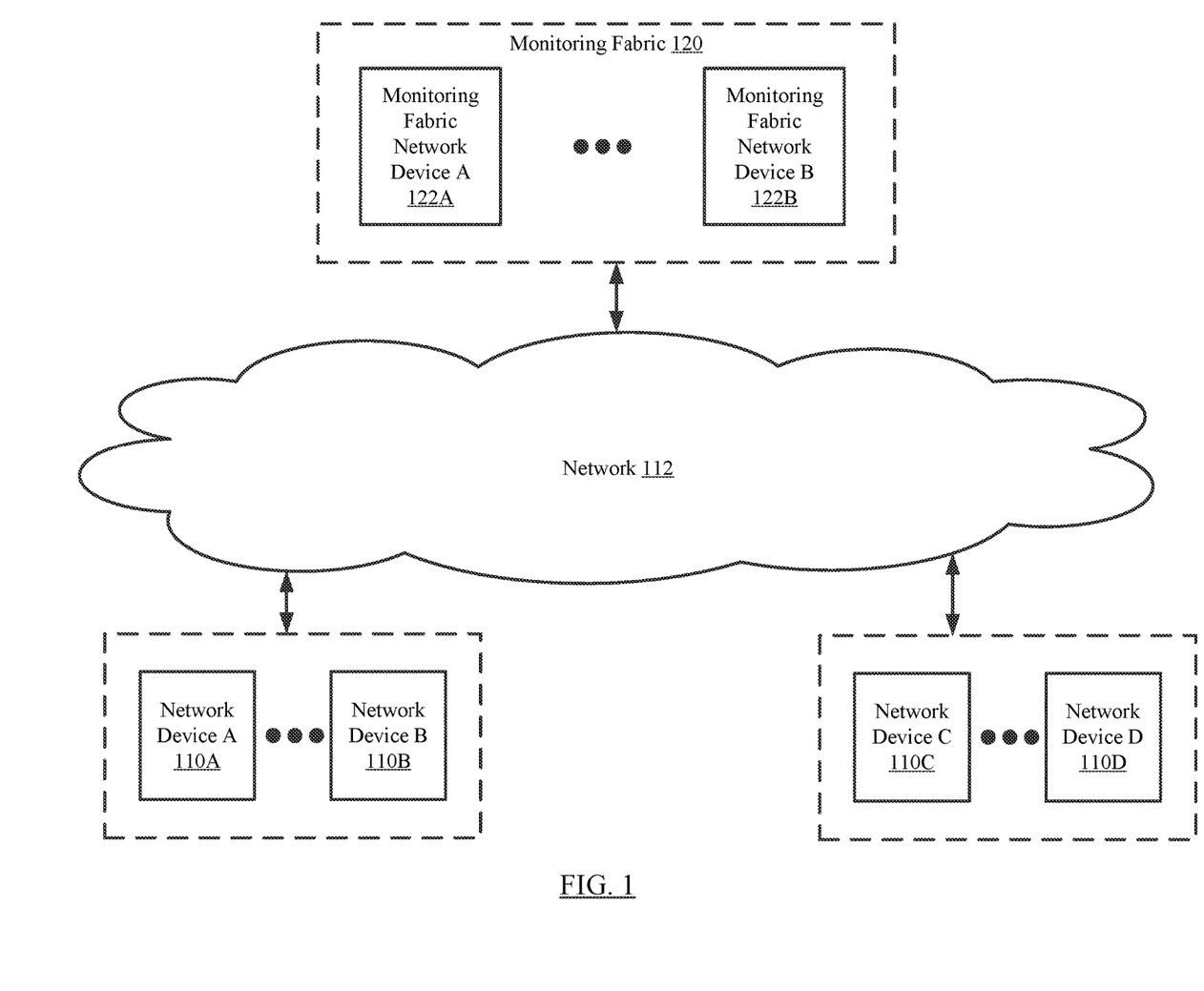
FIG. 1 shows a diagram of a system in accordance with one or more embodiments.

FIG. 1 shows a system in accordance with one or more embodiments of the disclosure. As shown in FIG. 1, the system includes a network (112) connected (directly or indirectly) to one or more network devices (110A, 110B, 110C, 110D) and a monitoring fabric (120) that includes one or more monitoring fabric network devices (122A, 122B). Each of these components is connected (directly or indirectly) via any combination of wired and/or wireless connections without departing from the disclosure. The system may include additional, fewer, and/or different components without departing from the disclosure. Each of the aforementioned components illustrated in FIG. 1 is described below.

In one embodiment of the disclosure, the one or more network devices (110A, 110B, 110C, 110D) are physical devices that include persistent storage, memory (e.g., random access memory), one or more processor(s), network device hardware (including a switch chip(s), line cards, etc.), and two or more physical ports. In one embodiment of the disclosure, the network device is hardware that determines which egress port on a network device to forward media access control (MAC) frames. Each physical port may or may not be connected to another device (e.g., a client device (not shown), another network device). The network device (or more specifically the network device hardware) may be configured to receive packets via the ports and determine whether to: (i) drop the packet; (ii) process the packet in accordance with one or more embodiments of the disclosure (see e.g., FIG. 2A); (iii) replicate the packet and transmit the replicated packet to the monitoring fabric (120), and/or (iv) send the packet, based on the processing, out from another port on the network device. While the aforementioned description is directed to network devices that support Ethernet communication, the disclosure is not limited to Ethernet; rather, the disclosure may be applied to network devices using other communication protocols.

In one embodiment of the disclosure, the one or more monitoring fabric network devices (122A, 122B) are physical devices that include persistent storage, memory (e.g., random access memory), one or more processor(s), network device hardware (including a switch chip(s), line cards, etc.), and two or more physical ports. The monitoring fabric (120) may include any number of monitoring fabric devices. The monitoring fabric network devices (122A, 122B) include functionality (which may be implemented in software and/or hardware (e.g., Field Programmable Gate Arrays (FPGAs), Application Specific Integrated Circuits (ASICs)) to implement the method shown in FIG. 2B and as further described in this application.

In one or more embodiments, the monitoring fabric (120) may implement a data analyzer (DANZ) monitoring fabric (DMF) mode of transmitting and monitoring packets traveling across the network (112). The DMF mode may include transmitting packets across the monitoring fabric (120) based on forwarding policies implemented by the monitoring fabric network devices (122A, 122B). Such forwarding policies may include utilizing metadata of the packets (e.g., included in the header) to determine the path of a packet in the monitoring fabric (120). For example, the metadata may include a virtual local area network (VLAN) tag that is used to determine the monitoring fabric network devices to which the packet is to be transmitted. For example, a monitoring fabric network device (122A, 122B) may use a VLAN tag of a replicated packet and an implemented forwarding policy to determine the next network device in the network path for the replicated packet. Other metadata may be used to determine where to transmit a packet by the monitoring packet network devices (122A, 122B) without departing from the disclosure.

In contrast to the above mechanisms of transmitting packets in the monitoring fabric (120), the network devices (110A, 110B, 110C, 110D) may utilize traditional network routing and forwarding mechanisms. For example, the network devices (110A, 110B, 110C, 110D) may implement layer 2 (L2) and/or layer 3 (L3) protocols. In one or more embodiments, L2 protocols may include utilizing the MAC addresses to determine a next hop of a network path for an obtained packet. Further, L3 protocols may include reading the internet protocol (IP) address of the packet to determine where to transmit the packet.

In one or more embodiments, the monitoring fabric (120) includes functionality for performing analysis and/or other data processing on the packets. The analysis and/or data processing may be based on configuration applied to the monitoring fabric network devices (122A, 122B). The configuration may be applied by, for example, administrators of the monitoring fabric (120). The analysis may include performing a classification on packets based on any of the information specified in the metadata. For example, the classification may be performed based on which network devices (110A, 110B, 110C, 110D) have forwarded the packets. The classification may be further based on, for example, the tags (e.g., VLAN tags) specified in the metadata, a geographical location of the source of the packet (e.g., specified in the metadata), and an intended destination (e.g., specified in the destination IP address of the header). The classification may be performed by other information without departing from the disclosure.

In one or more embodiments, multiple tiers of classification may be performed on the replicated packets that are received by monitoring fabric. In one or more embodiments, a first tier of monitoring fabric network devices (also referred to as edge network devices) may include functionality for performing initial classification. The initial classification may be performed, for example, in accordance with FIG. 2B. The result of the initial classification may include sending modified packets (also referred to as modified replicated packets) to a second tier of monitoring fabric network devices which may include additional functionality to perform secondary classification based on obtained modified packets. For example, the second tier may perform an action based on receiving the modified replicated packet such as extracting the classification tag(s) from the portion of the header corresponding to the L2 header and storing the extracted classification tag in a database. The database may include an aggregate list of classification tags for obtained modified packets from multiple monitoring fabric network devices (122A, 122B) of the first tier of the monitoring fabric (120).

In one or more embodiments, the modification performed on obtained replicated packets by the first tier of monitoring fabric network devices (122A, 122B) is performed on a data plane of the monitoring fabric network device (122A, 122B). In one or more embodiments, the data plane implements the forwarding policies discussed above. The data plane may be implemented using, for example, a switch chip (e.g., a field-programmable gate array, application specific integrated circuit (ASIC), etc.), programmable processor, microcontroller, digital signal processor, or any other hardware processor without departing from this disclosure. In one or more embodiments, the switch chip may include an ingress processing pipeline and an egress packet processing pipeline. As used herein, the ingress processing pipeline refers to a sequence of actions for processing packets on the ingress path (e.g., packets received from another network device). As used herein, the egress packet processing pipeline refers to a sequence of actions for processing packets on the egress path (e.g., packets in the process of being transmitted to another network device). By implementing the switch chip as an ASIC, embodiments provide high performance (low latency) monitoring, classification, and modification of packets.

In embodiments in which the modification and/or classification discussed above is not performed on a data plane of the monitoring fabric network device (122A, 122B), the modification performed on obtained replicated packets by the first tier of monitoring fabric network devices (122A, 122B) is performed on a control plane of the monitoring fabric network device (122A, 122B). In one or more embodiments, the control plane includes functionality for storing state information of the network device (122A, 122B) and utilizing the state information to perform routing mechanisms for the monitoring fabric network device (122A, 122B) (e.g., to generate the forwarding policies). Further, the control plane may include, for example, modules that each implement portions of the classification and/or modification as discussed throughout this disclosure. In this example, a first module may include functionality for performing the classification (e.g., as discussed in step 222 of FIG. 2B), and a second module may include functionality for performing the modification (e.g., as discussed in step 224 of FIG. 2B). The functionality of the control plane of the monitoring fabric network device (122A, 122B) may be implemented using, for example, a central processing unit (CPU). Other hardware and/or architecture may be utilized to perform the functionality of the control plane without departing from the disclosure.

In one or more embodiments disclosed herein, the modification to the obtained replicated packets is performed as part of the egress packet processing pipeline. The egress processing by the egress packet processing pipeline may be performed, for example, by dedicated hardware (not shown) in the switch chip. More specifically, the dedicated hardware may be a specialized hardware block which includes a general purpose arithmetic logic processing unit (ALU) with limited computational power in the switch chip (which may be implemented as an ASIC) that includes functionality for performing the egress processing and the modification of the obtained replicated packets discussed throughout this disclosure. In another embodiment, the dedicated hardware may be a specialized hardware block (i.e., a specialized circuit(s)) in the switch chip (which may be implemented as an ASIC) that includes functionality for performing at least a portion of steps 222 and 224 discussed in FIG. 2B. In this embodiment, the other portions of the egress processing are performed by the ASIC, but not by the specialized hardware block.

In one or more embodiments, the classification (see, e.g., FIG. 2B, step 222) is performed as a programmable function. Said another way, the specialized hardware block may be programmed to determine the classification tags to be used to modify the L2 headers. In contrast, conventional implementations may use a limited set of predetermined tables (e.g., MAC address tables) for any rewriting of the L2 headers prior to transmitting the packets. Embodiments disclosed herein may enable the aforementioned specialized hardware block to include functionality for determining the classification tags using functions (e.g., arithmetic functions). The use of the specialized hardware block enables the generation of a large set of classification tags that are determined using arithmetic functions as opposed to selecting values from predetermined tables. Further, by using the specialized hardware block, the values of the classification tags may be readily changed by reprogramming the specialized hardware block using a different function. In this manner, as the nature of the classification tag that an administrator wants to use changes, the administrator only needs to update the function in the specialized hardware block as opposed to generating an entirely new set of predetermined tables.

While embodiments disclosed herein discuss the use of replication to transmit packets from the network devices (110A, 110B, 110C, 110D) to the monitoring fabric (120), other mechanisms may be implemented for the monitoring fabric network devices (122A, 122B) to obtain packets. For example, the monitoring fabric network devices (122A, 122B) may implement optical traffic access points (TAPs) on the network devices (110A, 110B, 110C, 110D). As a second example, the monitoring fabric (120) may implement traffic interception mechanisms (e.g., an electrical TAP) that intercept packets based on an ingress interface (e.g., a port) or an egress interface in a network device (110A, 110B, 110C, 110D). Other mechanisms may be performed for obtaining packets from the network devices (110A, 110B, 110C, 110D) and transmitting these packets to the monitoring fabric (120) without departing from the disclosure.

Figure 2A:
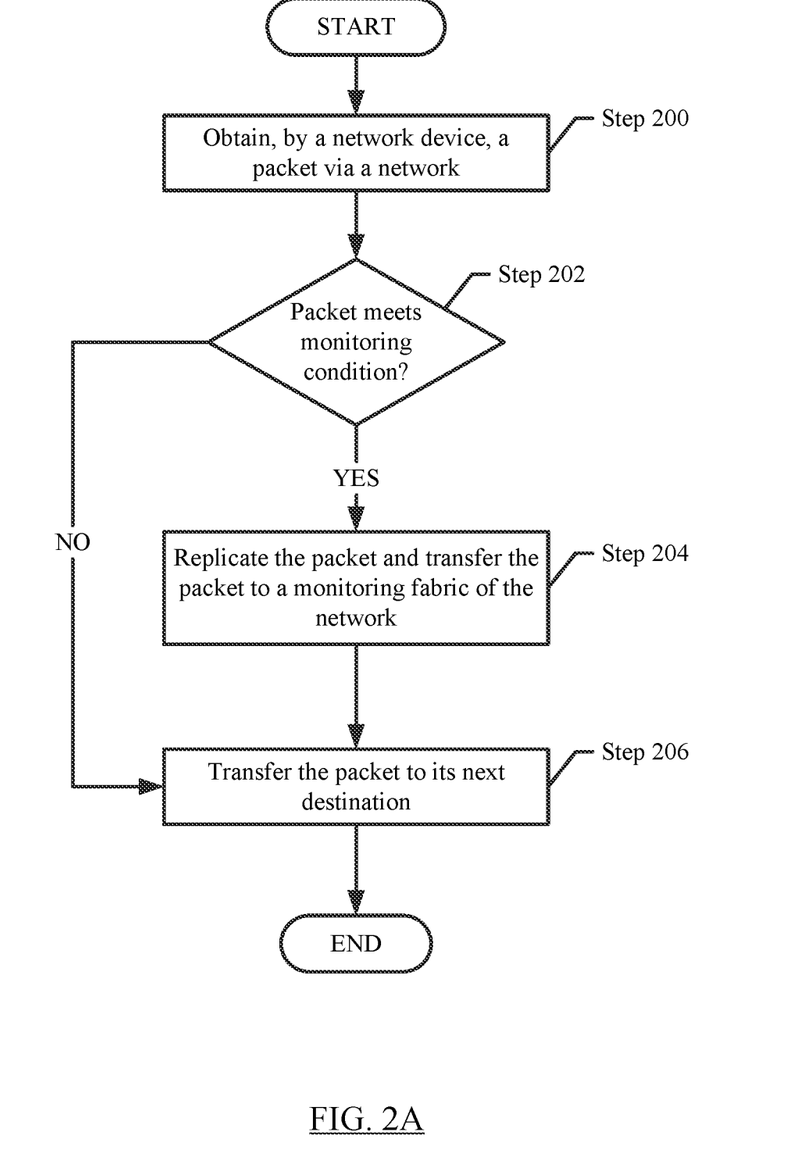
FIG. 2A shows a flowchart of a method for managing packets in accordance with one or more embodiments.

FIG. 2A shows a flowchart of a method for managing packets in accordance with one or more embodiments. The method of FIG. 2A may be performed by, for example, a network device (e.g., 110A, FIG. 1). Other components illustrated in FIG. 1 may perform the method of FIG. 2A without departing from the disclosure. Further, one or more steps in FIG. 2A may be performed concurrently with one or more steps in FIGS. 2A-2B.

While the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 200, a packet is obtained by the network device. The packet may be obtained via a network in which the network device operates. The packet may be obtained from a second network device. The second network device may be a source network device.

In step 202, a determination is made about whether the packet meets a monitoring condition. In one or more embodiments, a monitoring condition is a condition that specifies whether the packet is to be provided for analysis to the monitoring fabric. The monitoring condition may be based on, for example, which ingress interface of the network device obtains the packet. For example, the packet may meet the monitoring condition if the packet is ingested from an ingress interface on which the monitoring fabric applies an interception mechanism. As a second example, all packets that are ingested by the network device may meet the monitoring condition. The disclosure is not limited by the aforementioned examples; rather, any monitoring condition may be used to identify packets to be replicated and transmitted to the monitoring fabric.

In step 204, following the determination that the packet (or the network device) meets a monitoring condition, the packet is replicated (i.e., a copy is made of the packet) and transmitted to a monitoring fabric of the network. A monitoring fabric network device (e.g., 122A, 122B in FIG. 1) may ingest the replicated packet and process the replicated packet in accordance with FIG. 2B.

In step 206, the original packet is transmitted towards its destination. As discussed above, the network device may implement traditional packet routing and forwarding mechanisms. For example, the network device may analyze the L2 addresses and/or L3 addresses and determine, using routing and/or forwarding tables implemented by a data plane of the network device, the egress interface out of which the packet is to be transmitted.

Figure 2B:
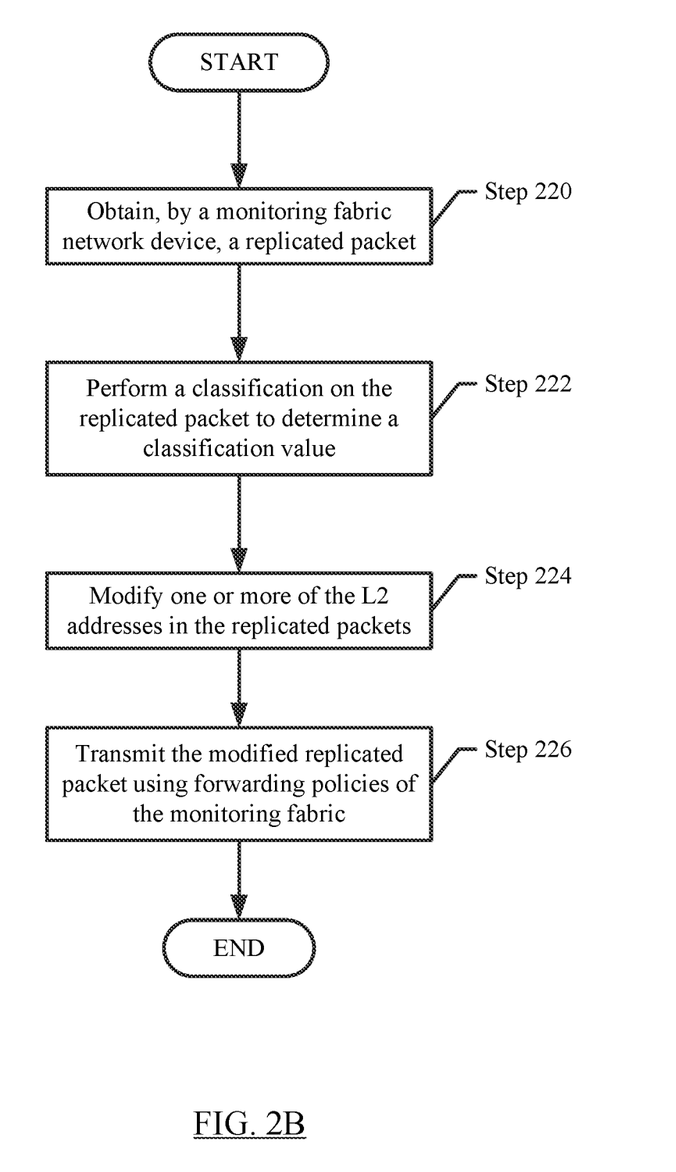
FIG. 2B shows a flowchart for a method for processing an upgrade on a control plane in accordance with one or more embodiments.

FIG. 2B shows a flowchart of a method for processing a packet in accordance with one or more embodiments. The method of FIG. 2B may be performed by, for example, a monitoring fabric network device (e.g., 122A, FIG. 1). Other components illustrated in FIG. 1 may perform the method of FIG. 2B without departing from the disclosure. Further, one or more steps in FIG. 2B may be performed concurrently with one or more steps in FIGS. 2A-2B.

While the various steps in the flowchart shown in FIG. 2B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 220, a monitoring fabric network device obtains a replicated packet. The replicated packet may be obtained via a network to which the monitoring fabric network device is connected and/or in which the monitoring fabric network device operates. For example, if the monitoring fabric network device is an edge device, then the monitoring fabric network device may receive the replicated packet from a network device via a network (e.g., 112).

In step 222, a classification is performed on the replicated packet to determine one or more classification values. In one or more embodiments disclosed herein, the classification refers to a process for determining a classification value used to generate a classification tag. The classification tag may be assigned to the replicated packet based on parameters associated with the replicated packet. For example, the classification may analyze the header (or portion thereof) of the replicated packet to obtain any relevant metadata (e.g., a VLAN tag, a geographical location of the source IP address of the packet, etc.). Based on the classification, a classification value is determined. The classification value may be, for example, a numerical value. The numerical value may be provided to an egress packet processing pipeline (e.g., implemented by a specialized hardware block) and used, by the egress packet processing pipeline, to perform the method of step 224.

In one or more embodiments, the classification further includes generating a second classification value. The second classification value may be generated using a similar mechanism described in step 222 and used for a second classification tag. However, the second classification value may be generated using portions of the header of the replicated packet that are different from the portions of the header of the replicated packet that were used to generate the first classification value.

In one or more embodiments disclosed herein, the classification discussed in step 222 is performed using an ingress processing pipeline. The result of the classification is the generation of a classification value. The classification value may be provided to an egress packet processing pipeline to perform, at least in part, the modification described in step 224. The egress packet processing pipeline performed in step 224 may be implemented using a specialized hardware which may include an embedded general purpose ALU.

In step 224, one or more classification tags are generated based on the classification value, and one or more of the L2 addresses are modified based on the classification tag to generate a modified replicated packet. In one or more embodiments, the classification value obtained during the classification is used to generate the classification tag and perform the modification. The classification tag may be generated based on a function applied to the obtained classification value and, optionally, using other values (e.g., portions of the header). The function may include, for example, applying an arithmetic function (e.g., a counter) to an existing L2 address(es) of the header. The arithmetic function may include, for example, summing the classification value to the source and/or destination L2 addresses. The aforementioned example is not intended to limit the scope of the disclosure; rather, any arithmetic function may be used using the classification value and any field(s) or portion(s) thereof in the packet.

In one or more embodiments, the modification includes replacing an existing L2 address(es) (i.e., an existing source and/or destination L2 address) with one (or more) classification tags. For example, if there are two classification tags generated in step 224, then a first classification tag may replace a source L2 address, and a second classification tag may replace the destination L2 address of the header. The result of step 224 is that all or a portion of the header of the replicated packet storing the existing L2 addresses is replaced with one or more classification tags. The amount of the existing L2 addresses that are replaced is based on the number of classification tags and/or the length of the classification tags.

While this disclosure discusses the modification of L2 addresses for introducing one or more classification tags, additional portions of the packet header may also be replaced with a classification tag. For example, the portions of the packet header that are typically used for VLAN tags (i.e., information defined in accordance with IEEE 802.1Q) may be replaced with one of the aforementioned classification tags. While the above disclosure discusses the use of the specialized hardware block to perform the functionality described in step 224, the specialized hardware block may also perform other modifications of the packet without departing from the disclosure.

In step 226, the modified replicated packet is transmitted towards another monitoring fabric network device (e.g., for further classification or analysis) or towards a computing device that includes functionality to analyze the modified replicated packet. In one or more embodiments, the modified replicated packet is transmitted based on forwarding policies implemented by the monitoring fabric network device. In one or more embodiments, the forwarding policies do not depend on the L2 addresses of the modified replicated packet. For example, the forwarding policies may utilize an L3 header (e.g., a source IP address or a destination IP address) to determine the network device to send the replicated packet. In this manner, the classification tag(s), which are stored in the portion of the header of the replicated packet that was previously used to store the L2 addresses, do not impact the determination of where the modified replicated packet is transmitted. Said another way, as the forwarding policies do not depend on the L2 addresses, the changes to the portions of the header that store the L2 addresses do not impact how the forwarding policies are applied to the modified replicated packet. As a second example, the forwarding policies may utilize a VLAN tag of the header for determining the next network device (or an egress interface) for forwarding the packet. This may allow the L2 source and destination addresses to be used by, for example, an analytic tool in the monitoring fabric for future classification and/or analysis.

While the various steps of FIG. 2B describe performing classification, modification, and/or transmission of a replicated packet, embodiments disclosed herein may be performed on any packets obtained by the monitoring fabric. The packets may or may not be replicated without departing from this disclosure.

Example

Figure 3A:
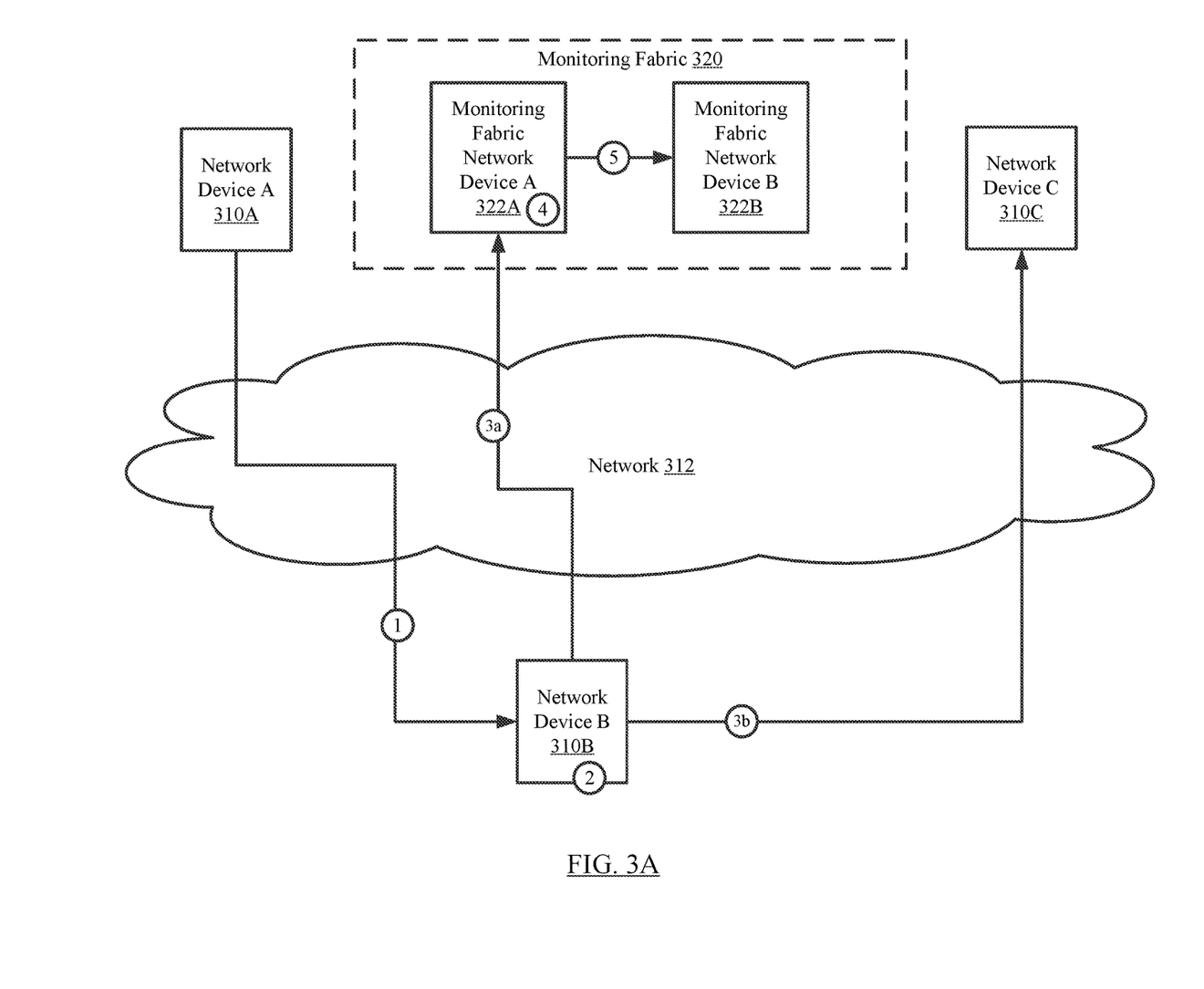
FIGS. 3A-3C show an example in accordance with one or more embodiments described herein.
Figure 3B:
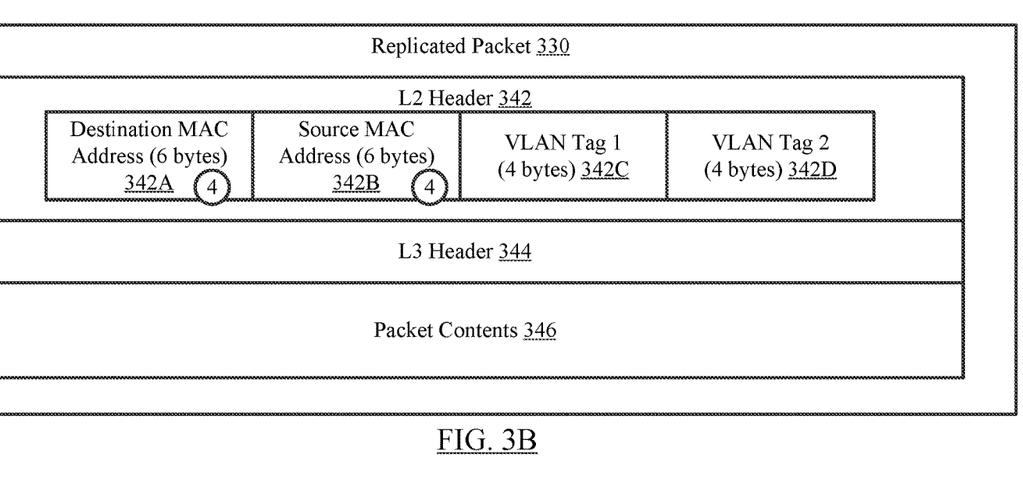
Figure 3C:
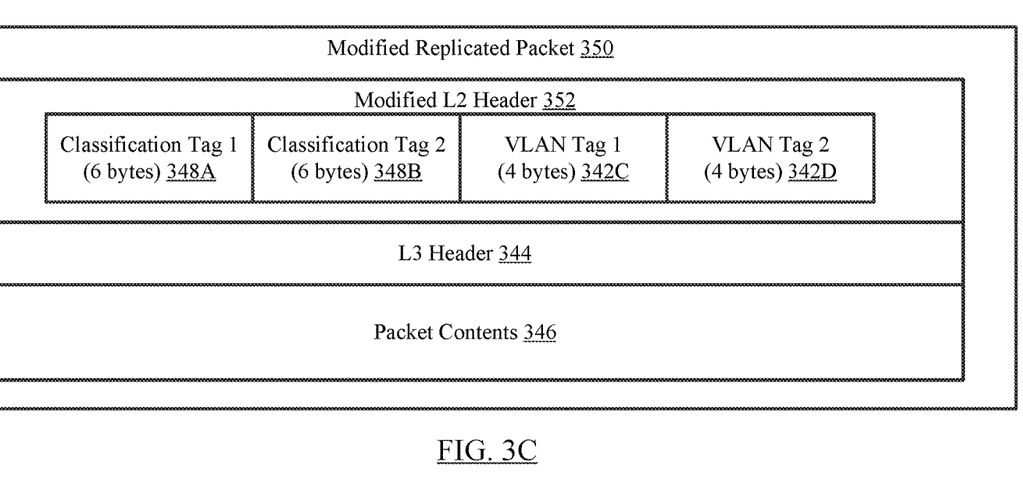

This section describes an example in accordance with one or more embodiments. The example is not intended to limit the scope of this disclosure. Turning to the example, FIGS. 3A-3C shows an example in accordance with one or more embodiments. The example shows a network (312) that connects three network devices: network device A (310A), network device B (310B), and network device C (310C).

Network device A (310A) is a source network device that desires to send a packet to network device C (310C). Network device A (310A) generates the packet that includes an L2 header and an L3 header. The L3 header includes a source IP address of network device A (310A) and a destination IP address of network device C (310C) that is used for transmitting by the network devices (310A, 310B, 310C) in the network (312). The L2 header includes source MAC address as the MAC address of network device A (310) and destination MAC address as network device B (310B) that may also be used for forwarding purposes. Network device A (310A) utilizes a forwarding table stored on a data plane of network device A (310A) to determine that the next hop in the network path for the packet is network device B (310B). Network device A (310A) transmits the packet to network device B (310B).

Network device B (310B) receives the packet. After receiving the packet, network device B (310B) determines that the packet meets a monitoring condition that is based on an interception mechanism performed on network device B (310B). The interception mechanism includes obtaining a replica of packets obtained from a particular ingress interface of network device B (310B). Because the packet is obtained by the particular ingress interface, the packet is replicated. The replicated packet is transmitted to the monitoring fabric (322A). Specifically, the replicated packet is transmitted to monitoring fabric network device A (322A). Further, network device B (310B) utilizes the L3 addresses of the headers and a forwarding table of network device B (310B) to determine the next hop of the network path for the packet as network device C (310C). Network device B (310B) rewrites the L2 header of the packet to include the source MAC address as the MAC address of network device B (310) and the destination MAC address as the MAC address of network device C (310C) and then transmits the packet (with the updated L2 header) to network device C (310C).

Returning to the replicated packet, monitoring fabric network device A (322A) obtains the replicated packet. After obtaining the replicated packet, monitoring fabric network device A (322A) initiates processing of the replicated packet using an egress packet processing pipeline. In this example, the egress packet processing pipeline is implemented in an ASIC, which includes a specialized hardware block which may include an embedded general purpose ALU in a monitoring fabric network device A (322A) to perform the modification of the obtained replicated packet.

In this example, two classification tags are generated for the replicated packet. The first classification tag is generated by performing a classification based on the ingress port from which the replicated packet is obtained by the monitoring fabric network device (322A) to obtain a first classification value. The monitoring fabric network device A (322A) utilizes a first function in the specialized hardware block and the first classification value to generate the first classification tag. Further, a second classification tag is generated, by performing a classification based on a source MAC address of the network device (i.e., 310B) from which the replicated packet is obtained to obtain a second classification value. The monitoring fabric network device A (322A) utilizes a second function in the specialized hardware block and the second classification value to generate the second classification tag.

The classification tags are applied to the replicated packet [4]. More specifically, the specialized hardware block overwrites the source MAC address and the destination MAC address in the L2 header with the first and second classification tags, respectively. For additional details regarding the modification of the replicated packet, see FIGS. 3B-3C.

Following the modification to the replicated packet, the modified replicated packet can be further processed using the egress packet processing pipeline (but not using the specialized hardware block). The result of the processing by the egress packet processing pipeline is the transmission of the modified replicated packet to monitoring fabric network device B (322B) using forwarding policies that do not utilize the modified L2 header (which now includes the first and second classification tags) [5]. Monitoring fabric network device B (322B) uses the classification tags of the modified replicated packet to update a database of aggregated classification tags obtained for other packets obtained from other monitoring fabric network devices (not shown). The updated database may be used for analysis of the network (312).

Turning to FIG. 3B, FIG. 3B shows a diagram of the replicated packet. The replicated packet (330) includes an L2 header (342), an L3 header (344), and packet contents (346). In this example, it is required that the L3 header (344) and the packet contents (346) are not modified. As such, the modifications are limited to the L2 header (342). The L2 header (342) includes a destination MAC address (342A), a source MAC address (342A) each using six bytes of data, and two VLAN tags (342C, 342D) each using four bytes of data. The VLAN tags (342C, 342D) may be used to determine the network path of the packet between network device A (310A) and network device C (310C). To reduce the use of additional bytes to apply the classification tags, the classification tags are used to replace the destination MAC address (342A) and source MAC address (342B).

Turning to FIG. 3C, FIG. 3C shows a diagram of the modified replicated packet. The modified replicated packet (350) includes a modified L2 header (352) that includes the two classification tags (i.e., classification tag 1 (348A) and classification tag 2 (348B)) which replace the destination MAC address (342A) and source MAC address (342B) and the two VLAN tags (342C, 342D).

End of Example

Specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase connected, or connection, means that there exists between elements/components/devices a direct or indirect connection that allows the elements to interact with one another in some way. For example, the phrase 'connected' may refer to any direct (e.g., wired directly between two devices or components) or indirect (e.g., wired and/or wireless connections between any number of devices or components connecting the connected devices) connection. Thus, any path through which information may travel may be considered a connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing packets in a monitoring fabric, the method comprising:
    obtaining, by a monitoring fabric network device operating in the monitoring fabric, a replicated packet, wherein the replicated packet is a replication of a packet sent to a second network device;
    performing a classification on the replicated packet;
    performing, based on the classification, a modification on a layer 2 (L2) address of the replicated packet to obtain a modified packet, wherein the modified packet comprises a modified L2 address; and
    transmitting the modified packet to a second monitoring fabric network device based on forwarding policies of the monitoring fabric,
    wherein the forwarding policies do not utilize the modified L2 address.

2. The method of claim 1, wherein the classification comprises performing a function on at least a portion of a header of the replicated packet.

3. The method of claim 2, wherein the function is an arithmetic function.

4. The method of claim 1, wherein the L2 address is a source media access control (MAC) address.

5. The method of claim 1, wherein the L2 address is a destination media access control (MAC) address.

6. The method of claim 1, further comprising:
    applying a second classification to the replicated packet; and
    performing, using the second classification, a second modification on a second L2 address of the replicated packet to obtain a second modified L2 address, wherein the modified packet comprises the second modified L2 address,
    wherein the L2 address is a source MAC address, and
    wherein the second L2 address is a destination MAC address.

7. The method of claim 6,
    wherein the classification comprises performing a first function on at least a portion of a header of the replicated packet; and
    wherein the second classification comprises performing a second function on at least another portion of the header of the replicated packet, wherein the at least another portion of the header is different than the at least the portion of the header.

8. The method of claim 1, wherein the modified L2 address is used by the second monitoring fabric network device to perform an action on the modified packet.

9. The method of claim 1, wherein the forwarding policies are implemented using a data plane of the monitoring fabric network device.

10. The method of claim 9,
    wherein the data plane comprises an application-specific integrated circuit (ASIC), and
    wherein the modification of the L2 address is performed on an egress processing pipeline implemented in the ASIC.

11. A monitoring fabric network device, comprising:
    an application-specific integrated circuit (ASIC) comprising an egress packet processing pipeline with a specialized hardware block comprising a general purpose arithmetic logic processing unit;
wherein the ASIC is programmed to:
obtain a replicated packet, wherein the replicated packet is a replication of a packet sent to a second network device;
obtain a classification value associated with the replicated packet from an ingress processing pipeline in the monitoring fabric network device;
apply a function to the classification value to generate a classification tag;
replace a layer 2 (L2) address of the replicated packet with the classification tag to generate a modified packet; and
transmit the modified packet to a second monitoring fabric network device based on forwarding policies,
wherein the forwarding policies do not utilize a portion of a L2 header in the modified packet that comprises the classification tag.

12. The monitoring fabric network device of claim 11, wherein the classification comprises performing an arithmetic function on a value obtained from at least a portion of a header of the replicated packet to generate the classification tag.

13. The monitoring fabric network device of claim 11, wherein applying the function to the classification value is performed using the specialized hardware block comprising a general purpose arithmetic logic processing unit.

14. The monitoring fabric network device of claim 11, wherein the L2 address is one of a source media control access (MAC) address and a destination MAC address.

15. A method for managing a network device, the method comprising:
obtaining, by a monitoring fabric network device operating in a monitoring fabric, a replicated packet, wherein the replicated packet is a replication of a packet sent to a second network device;
performing a classification, using an ingress packet processing pipeline in the monitoring fabric network device, on the replicated packet to obtain a classification value;
performing, using the classification value and a specialized hardware block, a modification on a source media access control (MAC) address and on a destination MAC address of the replicated packet to obtain a modified packet, wherein the modified packet comprises a modified source MAC address and a modified destination MAC address; and
transmitting the modified packet to a second monitoring fabric network device based on forwarding policies,
wherein the forwarding policies utilize a virtual local area network (VLAN) tag of the modified packet.

16. The method of claim 15, wherein the modification comprises performing an arithmetic function on a value in a header of the packet.

17. The method of claim 15, wherein the classification comprises performing a lookup in a lookup table using a value in a header of the packet.

18. The method of claim 15, wherein the modification comprises performing a first function on a first portion of a header of the packet and a second function on a second portion of the header.

19. The method of claim 18, wherein a result of performing the first function is used to generate the modified source MAC address and a result of performing the second function is used to generate the modified destination MAC address.

20. The method of claim 18, wherein the first function is an arithmetic function.

* * * * *